United States Patent
Kasai et al.

(10) Patent No.: US 7,894,092 B2
(45) Date of Patent: Feb. 22, 2011

(54) COMPUTER-READABLE RECORDING MEDIUM STORING PRINT IMAGE GENERATING PROGRAM AND PRINT IMAGE GENERATING METHOD

(75) Inventors: Satoshi Kasai, Kawasaki (JP);
Michihiro Hokamura, Kawasaki (JP);
Teruo Kumakiri, Kawasaki (JP);
Katsutoshi Sekimoto, Hino (JP);
Hideyuki Hirano, Kawasaki (JP);
Tomohisa Misawa, Kawasaki (JP);
Kensuke Tsurumaki, Hino (JP)

(73) Assignees: Fujitsu Limited, Kawasaki (JP); Fujitsu Advanced Engineering Limited, Tokyo (JP)

( * ) Notice: Subject to any disclaimer, the term of this patent is extended or adjusted under 35 U.S.C. 154(b) by 229 days.

(21) Appl. No.: 12/107,600

(22) Filed: Apr. 22, 2008

(65) Prior Publication Data
US 2008/0239362 A1 Oct. 2, 2008

Related U.S. Application Data

(60) Provisional application No. PCT/JP2005/019601, filed on Oct. 25, 2005.

(51) Int. Cl.
*G06F 15/00* (2006.01)
*G06K 9/00* (2006.01)

(52) U.S. Cl. ................ 358/1.15; 382/100

(58) Field of Classification Search ........... 358/1.14, 358/1.13, 1.15, 1.16, 1.18, 1.9, 1.8, 1.4, 540, 358/1.6, 402, 443, 504; 382/176, 100, 209; 709/201, 203, 229, 217; 399/116, 161; 400/88, 400/8
See application file for complete search history.

(56) References Cited

U.S. PATENT DOCUMENTS

| 7,253,920 B2 * | 8/2007 | Hosoda .................. 358/1.9 |
| 2001/0054156 A1 * | 12/2001 | Teshigawara ............ 713/194 |
| 2005/0248808 A1 * | 11/2005 | Ma et al. .................. 358/1.15 |

FOREIGN PATENT DOCUMENTS

| EP | 1 209 897 A2 | 5/2002 |
| JP | 11-298717 | 10/1999 |
| JP | A 11-298717 | 10/1999 |
| JP | A 2001-78006 | 3/2001 |
| JP | 2001-96837 | 4/2001 |
| JP | A 2001-96837 | 4/2001 |
| JP | A 2001-256027 | 9/2001 |

(Continued)

*Primary Examiner*—Saeid Ebrahimi Dehkordy
(74) *Attorney, Agent, or Firm*—Greer, Burns & Crain, Ltd.

(57) ABSTRACT

A print image generating program is capable of printing information that discourages fraudulent distribution of printed documents, irrespective of the type of printer. A print image generating apparatus has an application, a printer driver, a print management unit, and a virtual driver, and is designed to add tracking information that discourages distribution of printed documents when print data is printed. The print management unit monitors print requests from the application. When detecting a print request which was output from the application to the printer driver, the print management unit acquires and interrupts the print request destined for the printer driver. When the virtual driver receives a command from the print management unit, it acquires print data and tracking information, and generates tracking print image data by adding the tracking information to the print data, and gives the generated data to the printer driver.

8 Claims, 8 Drawing Sheets

FOREIGN PATENT DOCUMENTS

| | | |
|---|---|---|
| JP | A 2002-190947 | 7/2002 |
| JP | 2002-268851 | 9/2002 |
| JP | A 2002-544637 | 12/2002 |
| JP | A 2003-78751 | 3/2003 |
| JP | A 2003-283790 | 10/2003 |
| JP | A 2004-153568 | 5/2004 |
| JP | A 2004-184729 | 7/2004 |
| JP | A 2004-199419 | 7/2004 |
| JP | A 2005-85105 | 3/2005 |
| WO | WO 00/70585 A1 | 11/2000 |

\* cited by examiner

400 MANAGEMENT SCREEN

410 MANAGEMENT TABLE

| ACCOUNT NAME | USER NAME | GROUP NAME | NUMBER OF PRINTS | MAXIMUM NUMBER OF PRINTS |
|---|---|---|---|---|
| UA | UserA | SOFTWARE DEVELOPMENT DIVISION | 143 | 150 |
| UB | UserB | SOFTWARE DEVELOPMENT DIVISION | 154 | 150 |
| UC | UserC | SOFTWARE DEVELOPMENT DIVISION | 71 | 150 |
| UD | UserD | PROGRAM RESEARCH DIVISION | 133 | 100 |
| UE | UserE | PROGRAM RESEARCH DIVISION | 24 | 100 |

FIG. 6

COMPUTER-READABLE RECORDING MEDIUM STORING PRINT IMAGE GENERATING PROGRAM AND PRINT IMAGE GENERATING METHOD

This application is a continuing application, filed under 35 U.S.C. §111(a), of International Application PCT/JP2005/019601, filed Oct. 25, 2005.

BACKGROUND OF THE INVENTION (1) Field of the Invention

This invention relates to a computer-readable recording medium storing a print image generating program and a print image generating method, and more particularly to a computer-readable recording medium storing a print image generating program and a print image generating method, which are capable of adding to printed documents such information as to discourage intentional or accidental distribution of the printed documents.

(2) Description of the Related Art

In recent years, there are demands for preventing leaks of information stored in computers. A firewall installed on a network can prevent data leaks that are caused due to unauthorized external accesses. However, techniques including firewalls cannot deter or prevent internal users from fraudulently distributing data.

In order to prevent internal users from fraudulent distribution of the data, there is a method of encrypting data before being saved in a system, for example. The encryption technique allows encrypted data to be decrypted within the internal system only, but not in external systems. Thereby, the electronic data of information within a system can be prevented from being fraudulently distributed.

However, confidential data may be printed on papers in the internal system and the papers may be fraudulently taken out. In general, a "for internal use only" message or the like is printed on confidential printed documents, which discourages and prevents inadvertent distribution of the printed documents. In addition, there are known methods of printing the name of a person on his/her prints and of embedding watermark information in confidential data in an invisible manner, so as to specify the source of leaks of confidential documents (for example, Japanese Unexamined Patent Application Publication No. 2001-78006).

However, there is a drawback that not all printers but only dedicated (specified) printers should be used for the above security printing.

SUMMARY

This art has been made in view of foregoing and intends to provide a computer-readable recording medium storing a print image generating program and a print image generating method, which are capable of printing such information as to discourage fraudulent distribution of printed documents.

To accomplish the above object, there is provided a computer-readable recording medium storing a print image generating program for adding tracking information to print data in printing the print data to create a printed document, the tracking information discouraging distribution of the printed document. The print image generating program causes a computer to operate as: a print management unit for acquiring and interrupting a print request destined for a printer driver when an application outputs the print request to the printer driver; and a virtual driver for generating tracking print image data by adding the tracking information to the print data and giving the tracking print image data to the printer driver.

Further to accomplish the above object, there is provided a print image generating method for adding tracking information to print data in printing the print data to create a printed document, the tracking information discouraging distribution of the printed document. The print image generating method comprises the steps of: acquiring and interrupting a print request destined for a printer driver when an application outputs the print request to the printer driver; and giving tracking print image data generated by adding the tracking information to the print data, to the printer driver.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 shows a management screen of printing policy information.

DESCRIPTION OF THE PREFERRED EMBODIMENTS

A preferred embodiment of this invention will be described with reference to the accompanying drawings.

The outline of the invention to be employed in one embodiment will be first described, and then the specific embodiment will be described.

Figure 1:
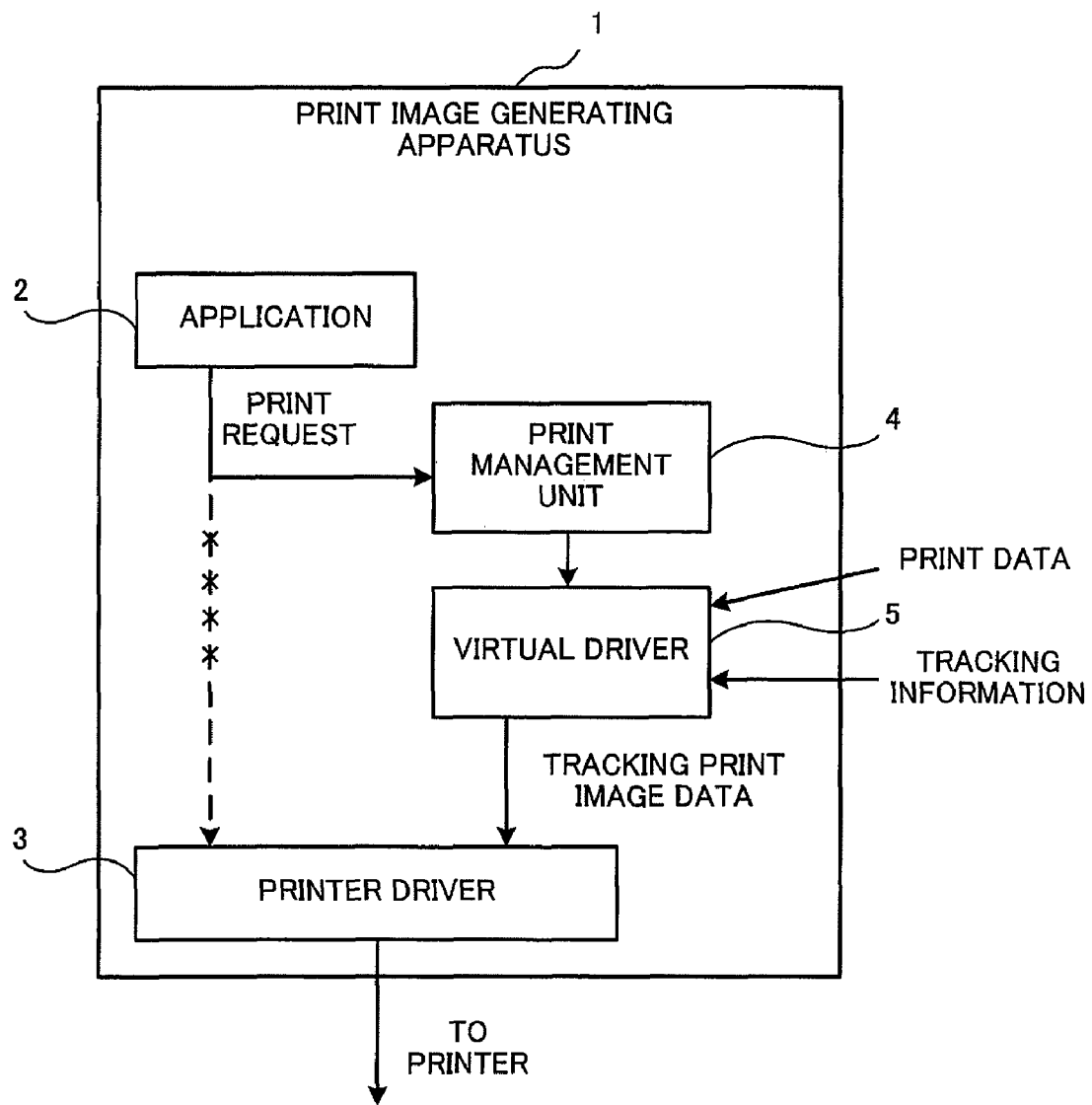
FIG. 1 is a principle view showing the outline of one embodiment.

FIG. 1 is a principle view showing the outline of one embodiment.

A print image generating program according to this invention causes a computer to operate as a print image generating apparatus 1.

The print image generating apparatus 1 has an application 2, a printer driver 3, a print management unit 4, and a virtual driver 5, and is designed to add tracking information to print data, which is to be printed, in printing the print data. The tracking information is information that identifies the source (computer, user, group, etc.) of printing of printed documents, and discourages fraudulent distribution of the printed documents.

The application 2 executes prescribed processes in accordance with an application program, and for printing, outputs a print request to the printer driver 3.

The printer driver 3 has a function of causing a specified printer (not shown) to print received data.

The print management unit 4 monitors print requests that are output from the application 2. When a print request is output, the print management unit 4 acquires and interrupts the print request destined for the printer driver 3. In this connection, the print management unit 4 is capable of transferring the print request from the application 2 to the printer driver 3 without interrupting it, depending on situations.

After the print management unit 4 acquires the print request, it checks whether the request is valid. When the print request is valid, the print management unit 4 gives a processing execution command to the virtual driver 5.

Upon reception of the processing execution command, the virtual driver 5 acquires the print data and the tracking information. For example, the print data is output from the application 2 when the print request is output from the application 2. Then the virtual driver 5 generates tracking print image data by adding the tracking information to the print data, and gives the generated data to the printer driver 3.

The following describes how the print image generating apparatus 1 operates.

When a print request is output from the application 2, the print management unit 4 acquires the print request, thereby interrupting the direct transmission of the print request from the application 2 to the printer driver 3. The print management unit 4 checks whether the request is valid. When it is confirmed that the request is valid, the print management unit 4 gives a processing execution command to the virtual driver 5. The virtual driver 5 acquires print data and tracking information to generate tracking print image data which is then output to the printer driver 3. The printer driver 3 causes a printer to print an image based on the tracking print image data.

As described above, when the print request is output, the tracking print image data is supplied to the printer driver 3. Then, the tracking print image data generated by adding the tracking information to the print data is printed, irrespective of the type of printer, thus making it possible to discourage fraudulent distribution of printed documents.

The embodiment will now be described in detail.

Figure 2:
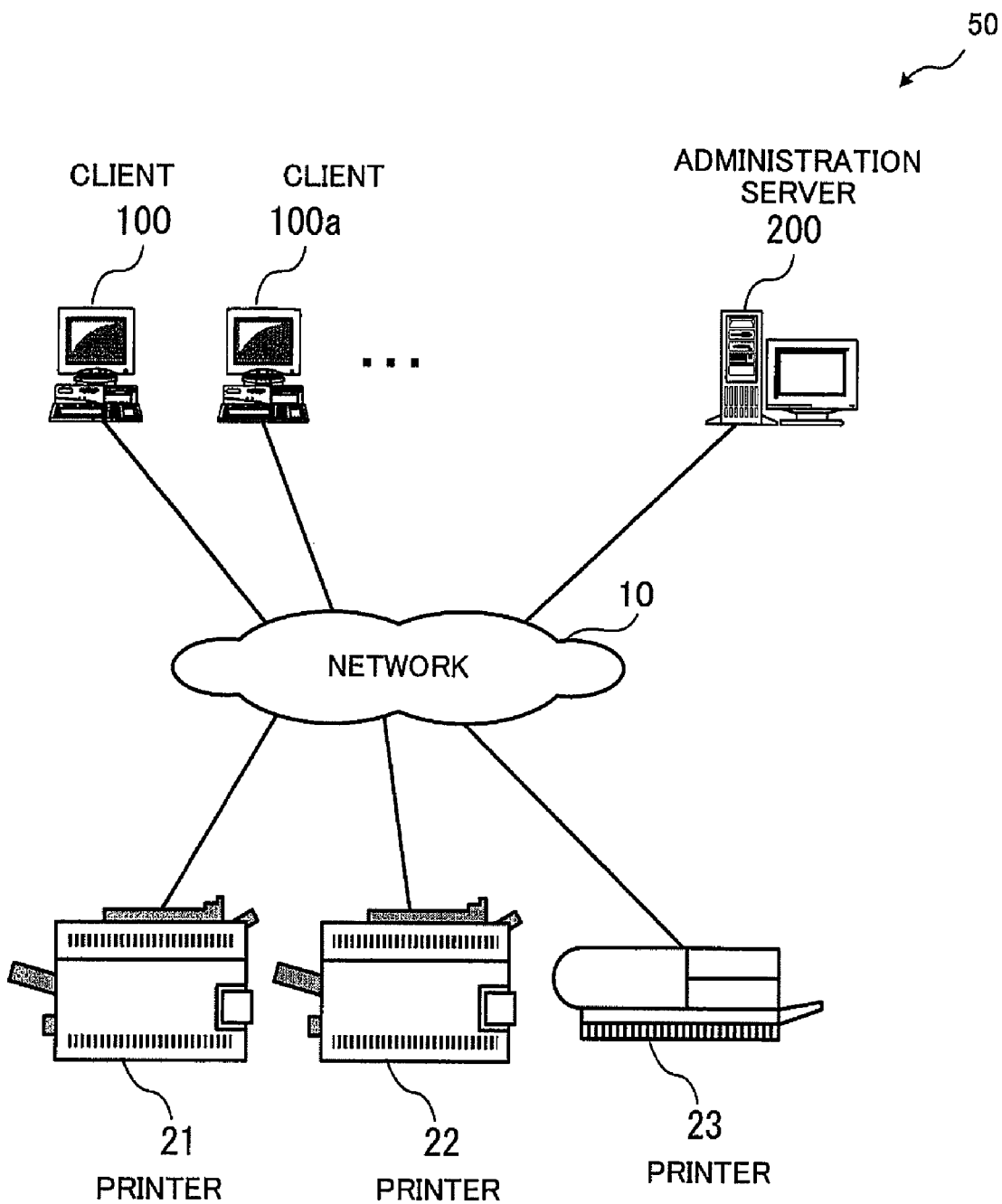
FIG. 2 shows an example of a system configuration of the embodiment.

FIG. 2 shows an example of a system configuration in this embodiment.

In the print image generating system 50, a plurality of clients (clients 100 and 100*a* in FIG. 2) which are computers, an administration server 200, and printers 21 to 23 are connected to each other via a network 10.

Upon reception of a print request from an internal application, the client 100, 100*a* performs a printing process to output the print request to a corresponding printer 21, 22, 23.

The administration server 200 responds to various requests from the clients 100 and 100*a*.

The printers 21, 22 and 23 have a function of printing data received from the clients 100 and 100*a*, and the printed documents can be taken out. In this embodiment, the printers 21 to 23 are connected to the clients 100 and 100*a* via the network 100. However, the printers 21 to 23 are not limited to this configuration, and may be local printers that are directly connected to the clients 100 and 100*a*.

The hardware configuration of the clients 100 and 100*a* will now be described. The following explanation uses the client 100 by way of example.

Figure 3:
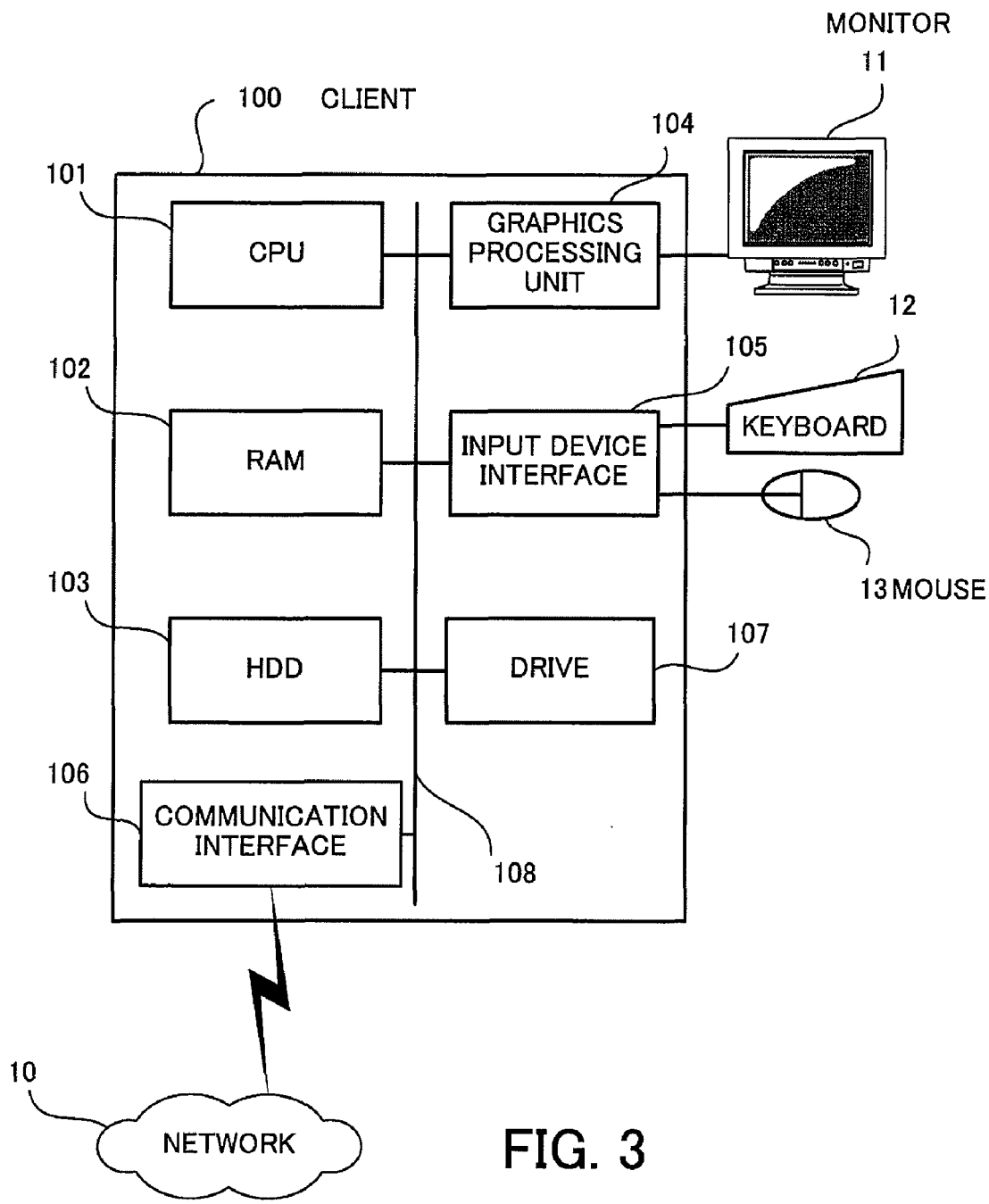
FIG. 3 shows an example of the hardware configuration of a client to be used in the embodiment.

FIG. 3 shows an example of the hardware configuration of a client to be used in the embodiment.

The client 100 is entirely controlled by a Central Processing Unit (CPU) 101. Connected to the CPU 101 via a bus 108 are a Random Access Memory (RAM) 102, a Hard Disk Drive (HDD) 103, a graphics processing unit 104, an input device interface 105, a communication interface 106, and a drive 107.

The RAM 102 temporarily stores at least part of an Operating System (OS) program and application programs. In addition, the RAM 102 stores various kinds of data for CPU processing. The HDD 103 stores the OS program and the application programs.

The graphics processing unit 104 is connected to a monitor 11, and is designed to display images on the screen of the monitor 11 under control of the CPU 101. The input device interface 105 is connected to a keyboard 12 and a mouse 13, and is designed to transfer signals from the keyboard 12 and the mouse 13 to the CPU 101 via the bus 108.

The communication interface 106 is connected to a network 10, and is designed to communicate data with other computers via the network 10.

The drive 107 has a function of reading and writing information data on an external memory medium in response to read/write requests. The external memory medium storing information data can be taken out.

The above-described hardware configuration realizes the processing functions of the embodiment. It should be noted that the administration server 200 can have the same hardware configuration as the client 100.

The following describes the configuration of program modules of the clients 100 and 100*a* and the administration server 200. It should be noted that the program modules are information describing processes to be performed by the clients 100 and 100*a* and the administration server 200, and the clients 100 and 100*a* and the administration server 200 can execute the prescribed functions in accordance with the program modules.

First the configuration of the program modules of the clients 100*a* and 100*a* will be described. Hereinafter, the client 100 will be described by way of example.

Figure 4:
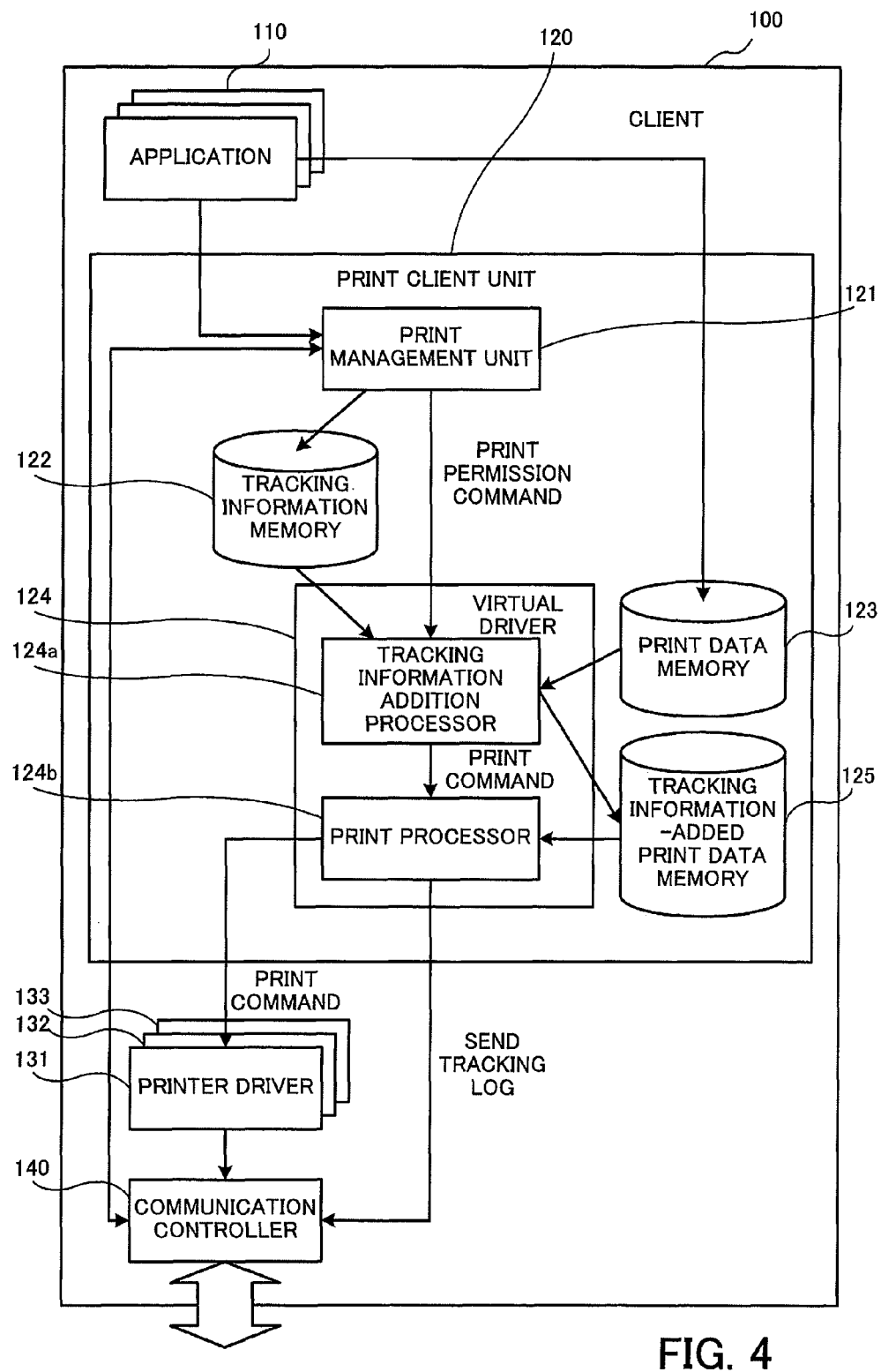
FIG. 4 is a block diagram showing the configuration of program modules of the client.

FIG. 4 is a block diagram showing the configuration of program modules of a client.

The client 100 has applications 110 for outputting print requests and print data (file), a print client unit 120 for dealing with print requests from the applications, printer drivers 131 to 133 provided for the printers 21 to 23, respectively, and a communication controller 140 connected to the administration server 200 and the printers 21 to 23 via the network 10.

The applications 110 include a document creation application, for example.

The print client unit 120 has a print management unit 121 for monitoring print requests which are output from the applications 110, a tracking information memory 122 for storing tracking information (will be described later), a print data memory 123 for storing print data spooled from the applications 110, a virtual driver 124, and a tracking information-added print data memory 125.

The print management unit 121 hooks a print request when the application 110 outputs the print request to one of the printer drivers 131 to 133 (in this case, the printer driver 131 is considered by way of example). That is, the print management unit 121 acquires and interrupts the printer request destined for the printer driver 131, and confirms (determines) the performance of the printer 21 which is specified as a printer by the application 110. For example, the print management unit 121 confirms the resolution of the printer 21 to see if the printer 21 can print the tracking information. If it is confirmed that the printer's resolution is too low to print the tracking information functionally, the print management unit 121 notifies the user of a printing error by displaying this message on the monitor 11, for example, and cancels the printing.

If the print request is destined for a printer that is capable of functionally embedding the tracking information, on the contrary, the print management unit 121 requests the administration server 200 to download printing policy information.

The printing policy information is information on a user (user account) of the client 100, 110a which has outputted the print request. This printing policy information will be described in detail later.

When the print management unit 121 receives the printing policy information from the administration server 200, it determines whether to allow the printing. Specifically, the print management unit 121 determines based on the printing policy information whether the user which has logged on to the client 100 belongs to a group or is a user which/who is permitted to execute the printing, determines by checking a printing history included in the printing policy information whether the user has a fraudulent-use history, and determines whether the print data (file) of the application 110 is data (file) which is permitted to be printed. If all of the above conditions are satisfied, the print management unit 121 generates tracking information based on the printing policy information, and outputs the generated information to the tracking information memory 122 and also outputs a print permission command to the virtual driver 124. If at least one of the above conditions is not satisfied, on the contrary, the print management unit 121 notifies the user of a printing error, and then cancels the printing.

The tracking information memory 122 stores the tracking information received from the print management unit 121.

The virtual driver 124 has a tracking information addition processor 124a and the print processor 124b.

Upon reception of a print permission command from the print management unit 121, the tracking information addition processor 124a receives the tracking information from the tracking information memory 122 and the print data from the print data memory 123, embeds the tracking information in the print data to thereby generate tracking information-added print data, and outputs the generated data to the tracking information-added print data memory 125 and also outputs a print command to the print processor 124b.

Upon reception of the print command, the print processor 124b extracts the tracking information-added print data from the tracking information-added print data memory 125, outputs the tracking information-added print data and the print command for the data to the selected printer driver 131, and also sends a tracking log which comprises the tracking information and a printing status (printing success or failure) to the administration server 200 via the communication controller 140.

Upon reception of the print command from the print processor 124b, the printer driver 131 sends the tracking information-added print data to the printer 21 via the communication controller 140 to thereby drive the printer 21.

Now, the configuration of the program modules of the administration server 200 will be described.

Figure 5:
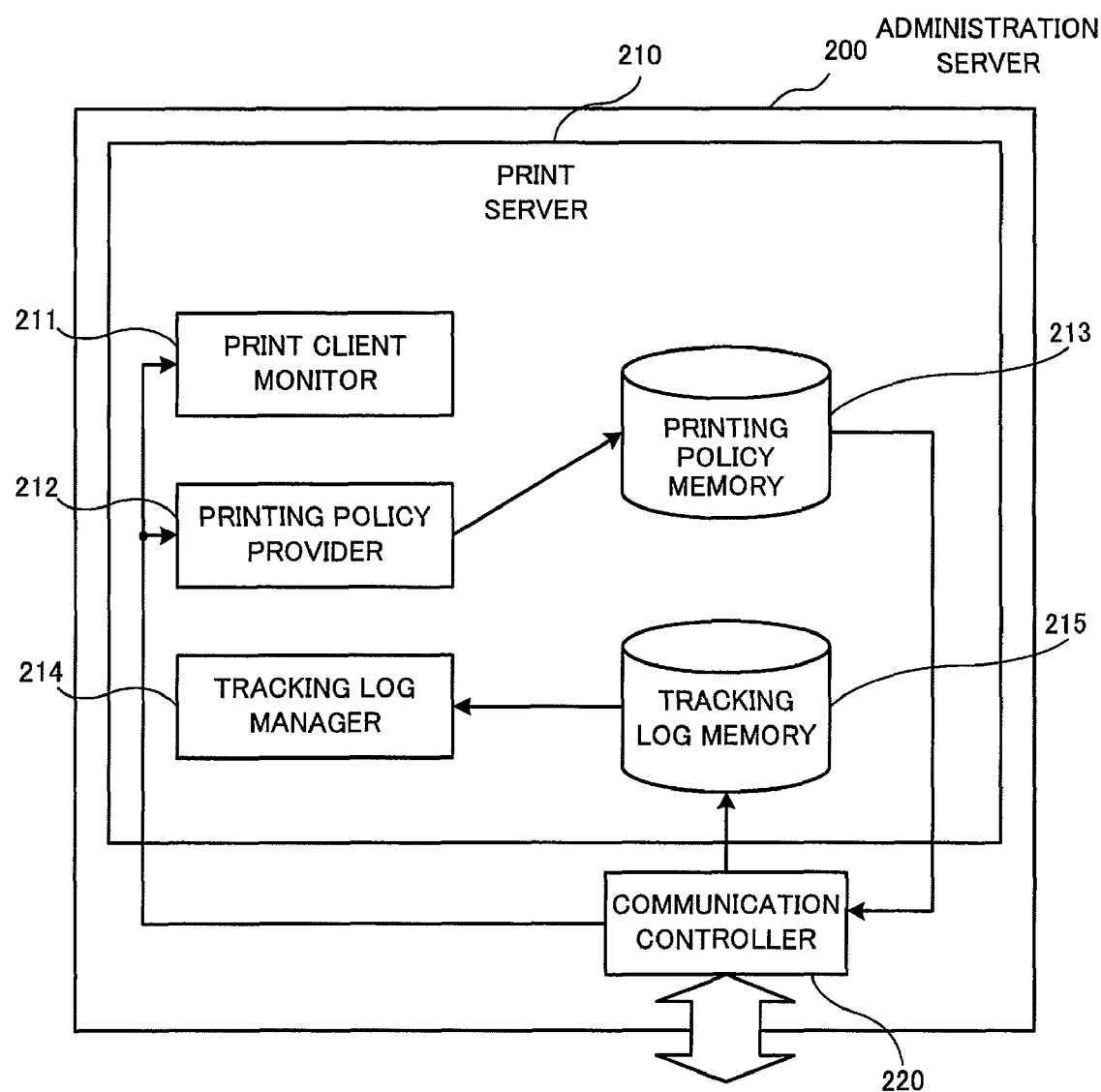
FIG. 5 is a block diagram showing the configuration of program modules of an administration server.

FIG. 5 is a block diagram showing the configuration of program modules of an administration server.

The administration server 200 has a print server 210 and a communication controller 220 for communicating with the clients 100 and 100a. The print server 210 has a print client monitor 211 for monitoring whether the print client unit 120 of the client 100, 100a works properly (whether it has not been changed or deleted fraudulently), a printing policy provider 212, a printing policy memory 213 for storing printing policy information, a tracking log manager 214, and a tracking log memory 215.

Upon reception of a download request of printing policy information from the client 100, 100a via the communication controller 220, the printing policy provider 212 sends a printing policy output request to the printing policy memory 213.

Upon reception of the printing policy output request, the printing policy memory 213 outputs printing policy information to the communication controller 220. Thereby, the printing policy information is transmitted to the client 100 (100a) which has outputted the download request of the printing policy information.

The tracking log manager 214 manages tracking logs stored in the tracking log memory 215, and displays tracking logs on the monitor (not shown) of the administration server 200 according to necessity.

The tracking log memory 215 stores received tracking logs.

The communication controller 220 is connected to the clients 100 and 100a via the network 10.

The following describes how the print management unit 121 of the client 100, 110a hooks a print request from the application 110 and operates.

In the case of using Windows (trademark) as OS, functions or methods are always executed for printing, irrespective of operations. Therefore, all printing operations can be controlled by hooking them.

In this embodiment, the print management unit 121 uses API hooking that is a resident application, and Shell hooking that covers cases that the API hook cannot deal with, to monitor print requests. When the application 110 outputs a print request, the print management unit 121 determines a printer driver which is the destination of the request. Then, the print management unit 121 cancels the print request if the print request is destined for a printer driver other than specified printer drivers, thereby prohibiting printing of unauthorized printers.

Specifically, when a function EndDoc( ) is called when the application 110 completes output of a print request, then the print management unit 121 hooks the function EndDoc( ) with the API hooking.

Actual printing is performed after this function. Therefore, by hooking the function EndDoc( ), the printing directly requested by the application can be stopped.

On the other hand, when a method Ishellexecutehook::execte is called when the application 110 completes output of a print request, then the print management unit 121 hooks the method Ishellexecutehook::execute with the Shell hooking.

Actual printing is performed after this method. Therefore, by hooking this method Ishellexecutehook::execute, the printing directly requested by the application can be stopped.

In addition, the print management unit 121 determines based on the property information of the driver included in the hooked process whether the specified printer is authorized. This can surely prevent a print request from being output to an unauthorized printer even if a user rewrites a driver name.

Now, printing policy information will be described.

The printing policy information is information on a user, including an account name, a user name, a group name, a usable file, a number of prints, a maximum number of prints, and print permission information of files. This information is set by an administrator responsible for managing the administration server 200.

FIG. 6 shows a management screen of printing policy information.

The management screen 400 shown in FIG. 6 shows a management table 410. The management table 410 has columns for "account name", "user name", "group name", "number of prints", and "maximum number of prints". Information arranged in a row is associated with each other. In this way, a collection of account name, user name, group name, etc., is set in the management table 410.

The "account name" column shows a user account. The "user name" column shows a user name (user ID) with which a user can log on to the client 100. The "group name" column shows the name of a group to which the user belongs. The "number of prints" column shows the total number of prints that the user has made via the print client unit 120 before. The "maximum number of prints" column shows the maximum number of prints which can be made at a time. Setting columns for the number of prints and the maximum number of prints can reduce a printing cost.

The printing policy information can be changed on a column basis in the management table 410, for example, on a group basis, on a user basis. This makes it possible for the administrator to easily manage this information.

In order to change the printing policy information, the administrator selects a desired user name or group name by clicking the right mouse button and changes the printing policy information.

A print item (print position) at which printing policy information is printed may be a header, a footer, or a background. In addition, the position, angle, font, transparency (visible transparency, invisible transparency (digital watermarking), trusty print) of the printing policy information can be desirably selected.

The following describes a printed document created by the print image generating system 50.

Figure 7:
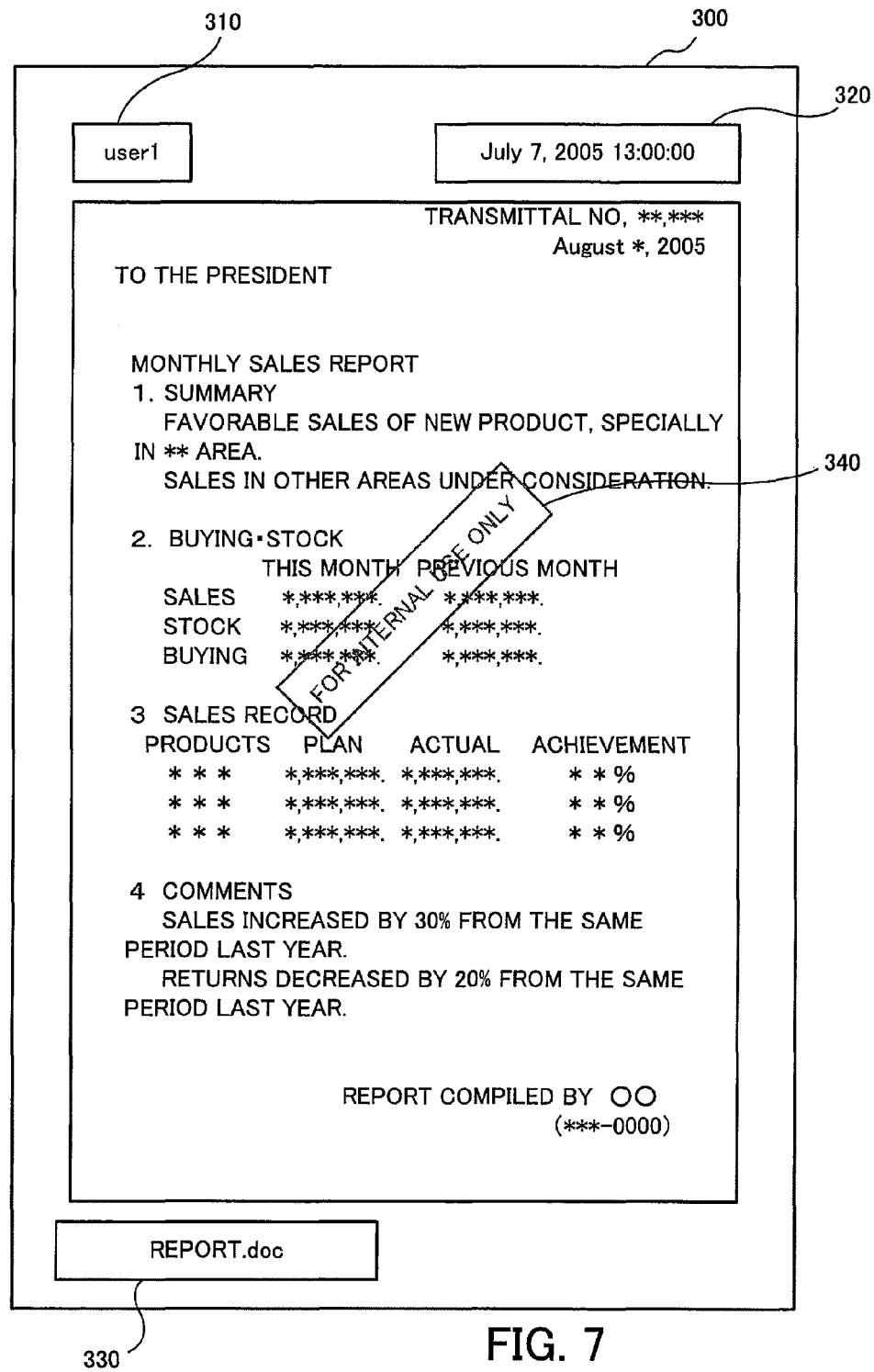
FIG. 7 shows a printed document created by a print image generating system.

FIG. 7 shows a printed document created by the print image generating system.

On the printed document 300, an item to be printed, etc. set in printing policy information is printed as tracking information.

Referring to FIG. 7, as the tracking information, a user name 310 and a date and time 320 are printed in the header, and a document name (file name) 330 is printed in the footer, and a "for internal use only" message 340 is printed in the background in a visible transparent manner.

The tracking information is not especially limited, provided that it can discourage fraudulent distribution of printed documents. However, information that can specify a person who printed is preferable. For example, the tracking information may be letters or an image identifying an account name, a document name, or a computer name, an IP address, a MAC address, or a printer name of a client which printed.

Now, the printing operation of the print image generating system 50 will be described. The following describes a case of outputting a print request to the printer driver 132, by way of example.

Figure 8:
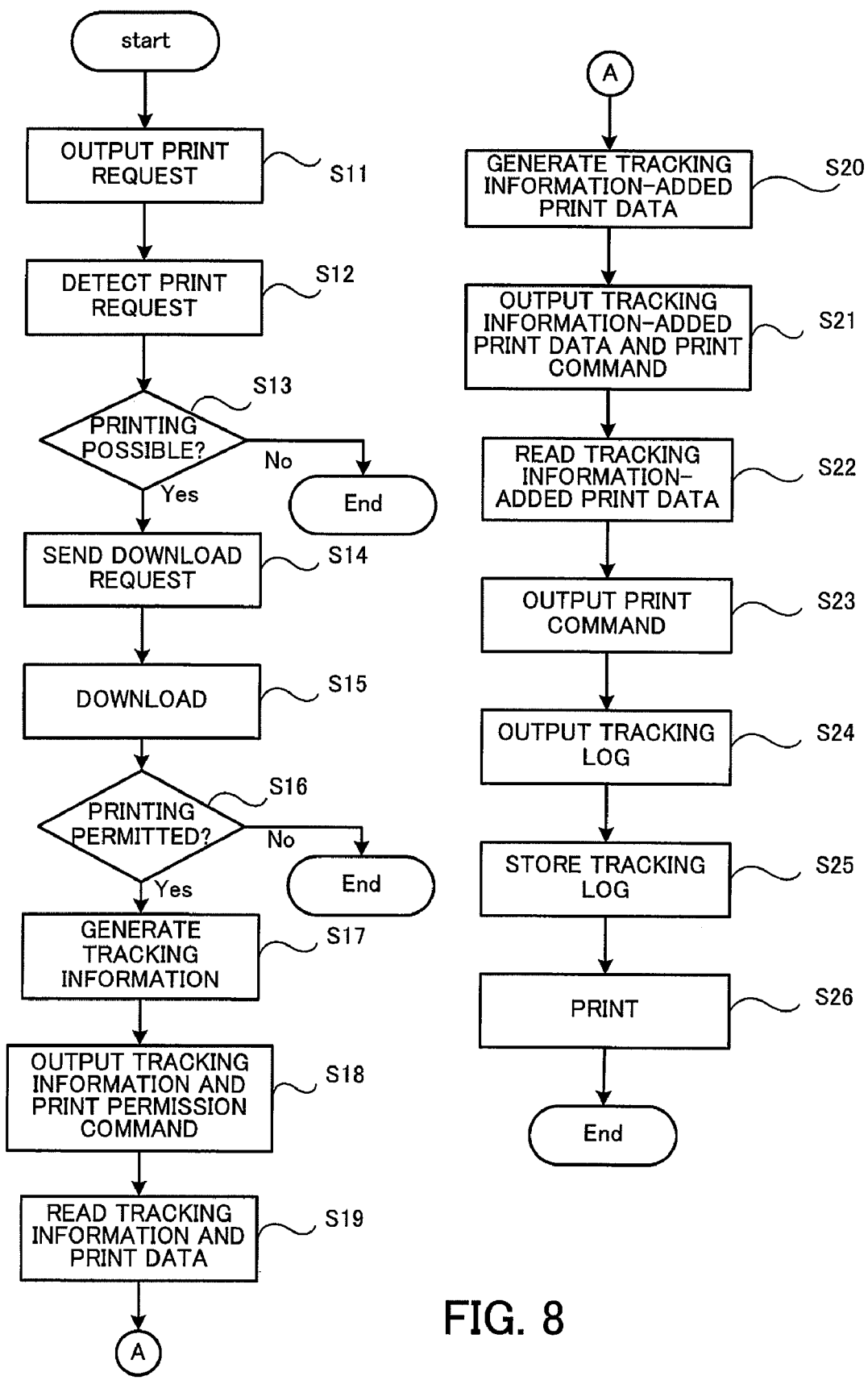
FIG. 8 is a flowchart showing a printing operation of the print image generating system.

FIG. 8 is a flowchart showing a printing operation of the print image generating system.

When the application 110 outputs a print request (step S11), the print management unit 121 detects the print request (step S12), and interrupts the direct print command from the application 110 to the printer driver 132.

Next, the print management unit 121 determines whether the printer 22 can print tracking information (step S13).

If it is determined that the printer 22 cannot print the tracking information (no at step S13), the print management unit 121 displays a printing error message on the monitor 11, and then this printing operation is terminated.

If it is determined that the printer 22 can print the tracking information (yes at step S13), on the contrary, the print management unit 121 sends a download request to the printing policy provider 212 (step S14).

The printing policy provider 212 acquires the printing policy information of the user who has made the print request, and outputs the printing policy information to the print management unit 121. Thereby the printing policy information is downloaded in the print management unit 121 (step S15).

Then, the print management unit 121 determines whether to permit the printing (step S16).

If the printing is not permitted (no at step S16), the print management unit 121 displays a printing error message on the monitor 11, and then this printing operation is terminated.

If the printing is permitted (yes at step S16), on the contrary, the print management unit 121 generates tracking information based on the printing policy information (step S17).

Then, the print management unit 121 outputs the tracking information to the tracking information memory 122, and outputs a print permission command to the tracking information addition processor 124a (step S18).

The tracking information addition processor 124a reads the tracking information and print data (step S19).

Then, the tracking information addition processor 124a generates tracking information-added print data (step S20).

Then, the tracking information addition processor 124a outputs the tracking information-added print data to the tracking information-added print data memory 125, and outputs a print command to the print processor 124b (step S21).

Then, the print processor 124b reads the tracking information-added print data (step S22). Then the print processor 124b outputs the print command for the tracking information-added print data to the printer driver 132 (step S23), and outputs a tracking log to the tracking log memory 215 (step S24).

Then, the tracking log memory 215 stores the tracking log (step S25).

Then, the printer 22 makes a print (step S26).

Then, the printing operation is terminated.

As described above, according to the print image generating system 50 of this embodiment, in response to a print request from the application 110, the client 100, 100a is designed so that the print management unit 121 hooks the print request and performs a prescribed confirmation process, and then the virtual driver 124 generates tracking information-added print data and gives it to a printer driver. Therefore, the tracking information can be embedded, irrespective of the type of printer. By embedding, as tracking information, printing information such as who, when, and what kind of information, printed documents come to be capable of discouraging fraudulent distribution. In addition, even if a printed document is fraudulently distributed, a printer or a user who created the printed document can be specified easily.

Further, every time when the client 100, 100a makes a print request, a download request of printing policy information is made to download the printing policy information from the administration server 200, thereby making it difficult to rewrite tracking information with the clients 100 and 100a. Therefore, the system security can be improved, and the contents changed with the administration server 200 can be automatically, easily, and accurately reflected.

Furthermore, since the print management unit 121 uses the API hooking and the shell hooking, print requests from the application 100 can be detected easily without failure. Therefore, all print requests can be detected, irrespective of application.

Still further, the print client monitor 211 allows an administrator to easily and correctly detect fraudulent acts done with the clients 100 and 100a.

Still further, by storing tracking logs, it can be easily and surely detected without actually confirming printed documents, who printed, when prints were made, and what kind of information was printed. Therefore, data can be managed in more safety and accuracy.

Still further, printers that have too low resolution to print tracking information are prohibited from making prints, thus making it possible to prevent information leaks more easily and accurately.

It should be noted that the print client unit 120 may be designed to autonomously determine validity of tracking information based on past tracking information when generating the tracking information. For example, in the case where a user who has logged on to the client 100, 110a belongs to a prescribed group, the tracking information relating to the group name may be added to print data, even if information of the group name is not included in printing policy information received from the administration server 200. Thereby, tracking can be performed easily.

Still further, the print client unit 120 may be designed so as to, when the virtual driver 124 completes the printing process successfully, notify the print management unit 121 of the printing success, and the print management unit 121 may be designed so as to notify the administration server 200 of this success. Thereby, the administration server 200 (administrator) can surely know whether the printing has been completed successfully.

Still further, the print management unit 121 may be designed so as to determine whether the setting information of the print client unit 120 has not been changed or to detect masquerade. Thereby, information leaks of printed documents can be surely prevented.

Still further, the print management unit 121 may be designed so as to inform the administrator of printing cancellation in the case where the application 110 makes a print request but the printing is cancelled.

The processing functions described above can be realized by a computer. In this case, a print image generating program is prepared, which describes processes for the functions to be performed by the client 100, 100a. The program is executed by the computer, whereupon the processing functions are accomplished by the computer. The program, which describes the above processing functions, may be recorded on a computer-readable recording medium. Computer-readable recording media include magnetic recording devices, optical discs, magneto-optical recording media, semiconductor memories, etc. The magnetic recording devices include Hard Disk Drives (HDD), Flexible Disks (FD), magnetic tapes, etc. The optical discs include Digital Versatile Discs (DVDs), DVD-Random Access Memory (RAM), Compact Disc Read Only Memory (CD-ROM), CD-Recordable (CD-R)/ReWritable (RW), etc. The magneto-optical recording media include Magneto-Optical disks (MOs) etc.

To distribute the program, portable recording media, such as DVDs and CD-ROMs, on which the program is recorded may be put on sale. Alternatively, the program may be stored in the storage device of the server computer and may be transferred from the server computer to the computer through a network.

The computer which is to execute the print image generating program stores in its storage device the server program recorded on a portable recording medium or transferred from the server computer. The computer reads the server program from the storage device and executes a process according to the program. Alternatively, the computer may run the program directly from the portable recording medium to execute the process according to the program. Also, while receiving the program being transferred from the server computer, the computer may sequentially run this program.

According to this invention, information that discourages and prevents fraudulent distribution of printed documents can be printed, irrespective of the type of printer.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable recording medium storing a print image generating program for adding tracking information to print data in printing the print data to create a printed document, the tracking information discouraging distribution of the printed document, the print image generating program causing a computer to operate as:

a print management unit for acquiring and interrupting a print request destined for a printer driver when an application outputs the print request to the printer driver; and a virtual driver for generating tracking print image data by adding the tracking information to the print data and giving the tracking print image data to the printer driver, wherein the print management unit determines whether to permit the print request, based on performance of a printer corresponding to the printer driver, and if the printer has a resolution lower than a prescribed threshold, does not permit the print request.

2. The computer-readable recording medium the tracking print image the print management unit according to claim 1, wherein:

the print management unit permits the print request; and the virtual driver gives the tracking print image data to the printer driver if the print management unit permits the print request.

3. The computer-readable recording medium according to claim 1, wherein the print management unit outputs a request to an administration server in response to the print request, and generates the tracking information based on printing policy information returned from the administration server in response to the request, the administration server controlling the computer.

4. The computer-readable recording medium according to claim 3, wherein the printing policy information is information on a user who has outputted the print request.

5. The computer-readable recording medium according to claim 3, wherein the virtual driver has a notification unit for notifying the administration server of a printing status.

6. The computer readable recording medium according to claim 5, wherein the printing status includes the tracking information.

7. A print image generating method for adding tracking information to print data in printing the print data to create a printed document, the tracking information discouraging distribution of the printed document, the print image generating method comprising the steps of:

acquiring and interrupting a print request destined for a printer driver when an application outputs the print request to the printer driver; and giving tracking print image data generated by adding the tracking information to the print data, to the printer driver, wherein a request is outputted to an administration server in response to the print request, and the tracking information is generated based on printing policy information returned from the administration server in response to the request.

8. A non transitory computer-readable recording medium storing a print image generating program for adding tracking information to print data in printing the print data to create a printed document, the tracking information discouraging distribution of the printed document, the print image generating program causing a computer to operate as:

a print management unit for acquiring and interrupting a print request destined for a printer driver when an application outputs the print request to the printer driver; and a virtual driver for generating tracking print image data by adding the tracking information to the print data and giving the tracking print image data to the printer driver, wherein the print management unit outputs a request to an administration server in response to the print request, and generates the tracking information based on printing policy information returned from the administration server in response to the request, the administration server controlling the computer.

* * * * *